United States Patent [19]

Melville et al.

[11] Patent Number: 5,751,465

[45] Date of Patent: May 12, 1998

[54] MINIATURE OPTICAL SCANNER FOR A TWO AXIS SCANNING SYSTEM

[75] Inventors: Charles D. Melville, Issaquah; Thomas A. Furness, III; Michael R. Tidwell, both of Seattle, all of Wash.

[73] Assignee: University of Washington, Seattle, Wash.

[21] Appl. No.: 664,103

[22] Filed: Jun. 13, 1996

Related U.S. Application Data

[62] Division of Ser. No. 329,508, Oct. 26, 1994, Pat. No. 5,557,444.

[51] Int. Cl.⁶ .................................................. G02B 26/08
[52] U.S. Cl. .................... 359/213; 359/199; 359/201; 359/202; 359/214
[58] Field of Search ................................ 359/196, 201, 359/202, 209, 212–215, 199; 347/225, 256–260

[56] References Cited

U.S. PATENT DOCUMENTS

| 4,323,307 | 4/1982 | Seeley | 355/51 |
| 4,953,961 | 9/1990 | Ubhayakar | 359/212 |
| 5,136,415 | 8/1992 | Bean | 359/213 |

*Primary Examiner*—James Phan
*Attorney, Agent, or Firm*—McAndrews, Held & Malloy, Ltd.

[57] ABSTRACT

A miniature optical scanner includes an electromagnetic drive having stationary magnets and stationary drive coils to minimize the rotational inertia of the scanner and increase the scanner's resonant frequency. The scanner is such that the resonant frequency is manually tunable as well as automatically adjustable to compensate for variables causing frequency drift. The optical scan angle is increased by employing a multiplying mirror with the optical scanner. For a two axis scanning system, the multiplying mirror may be formed of a second optical scanner to increase the optical scan angle relative to both of the axes.

7 Claims, 8 Drawing Sheets

5,751,465

MINIATURE OPTICAL SCANNER FOR A TWO AXIS SCANNING SYSTEM

This application is a divisional of U.S. patent application Ser. No. 08/329,508 filed on Oct. 26, 1994, now U.S. Pat. No. 5,557,444.

TECHNICAL FIELD

The present invention is directed to a miniature optical scanner for a one or two axis scanning system and more particularly to a miniature optical scanner having stationary magnets and stationary drive coils to raise the resonant frequency of the system, the resonant frequency being manually tunable and automatically adjustable to compensate for variables causing frequency drift. The scanning system includes a multiplying mirror to substantially increase the optical scan angle of the optical scanner. Further, a second optical scanner may be used as the multiplying mirror to provide a two axis scan with substantially increased optical scan angles for both axes.

BACKGROUND OF THE INVENTION

Optical resonant scanners of various types are known but are in general not suitable for use in applications such as a head mounted display system that requires the scanners to be very small so that they may be comfortably supported on a user's head. Scanners used in such systems must also be operable at a high frequency of resonance such as 20 khz. One type of known optical resonant scanner includes moving magnets as part of an electromagnetic circuit for oscillating a scanning mirror. However, because the magnets move, these scanners have a higher rotational inertia than desirable making it difficult to attain a sufficiently high resonant frequency for many applications.

SUMMARY OF THE INVENTION

In accordance with the present invention, the disadvantages of prior optical resonant scanners and multiple axis scanning systems have been overcome. The optical scanner of the present invention is a miniature optical resonant scanner capable of operating at very high frequencies. This miniature optical scanner is used with a multiplying mirror to provide a scanning system with an output optical scan angle that is substantially larger than the optical scan angle of the optical scanner itself. Further, a second optical scanner may be used as the multiplying mirror to provide a two axis scan with substantially increased optical scan angles for both axes while minimizing the size and weight of the overall system. The optical scanner and optical scanning system of the present invention have numerous uses such as in head mounted display systems, video displays in general, cameras, bar code readers, ophthalmological devices, etc.

More particularly, the miniature optical scanner of the present invention includes a ferromagnetic base with first and second stator poles formed thereon. The first and second stator poles are generally parallel to each other. Each stator pole includes a respective stator coil wound thereabout to produce magnetic fields in the stators of opposite polarity in response to a drive signal applied to each coil. First and second magnets are disposed on the base of the scanner on opposite sides of the first and second stators such that the magnets are equidistant to the first and second stators. The optical scanner also includes a thin metal spring plate having first and second support portions that rest respectively on the first and second magnets. The spring plate also includes a centrally located mirror mounting portion disposed above the stators, the mirror mounting portion having an axis of rotation that is equidistant to the stator poles. A mirror is formed on the mirror mounting portion of the spring plate so that when an alternating drive signal is applied to the first and second stator coils, magnetic fields are created that oscillate the mirror about the axis of rotation of the spring plate's mirror mounting portion. This oscillating mirror scans light incident thereto relative to a first axis.

This optical scanner may be made very small, having dimensions, for example, that are less than two centimeters in diameter or width and length, and less than one centimeter in height. Further, because the mass of the moving parts in the scanner is minimized and is as close to the axis of rotation as possible, the rotational inertia of the scanner is minimized. Thus, the optical scanner of the present invention has a high resonant frequency such as on the order of 24 khz.

The optical scanner of the present invention includes means for manually adjusting the resonant frequency of the scanner. Further, the scanner also includes means for automatically varying the amount of tension in the spring plate to maintain the resonant frequency constant. Thus, the tension in the spring plate can be automatically adjusted to accommodate for variations in temperature and other factors which if not compensated for would alter the resonant frequency of the scanner.

In accordance with another feature of the present invention the optical scanner may be disposed in a housing forming a vacuum chamber so as to minimize problems with loss of energy, air turbulence and noise when operating at high speeds. The housing may also be formed with a scanning window to allow light to enter the housing and be reflected out from the housing by the scanning mirror. The scanning window is disposed in the housing at an angle with respect to the mirror when the mirror is in its rest position to minimize the effect of reflections from the housing window.

These and other objects, advantages and novel features of the present invention, as well as details of an illustrated embodiment thereof, will be more fully understood from the following description and from the drawing.

DESCRIPTION OF THE PREFERRED EMBODIMENT

Figure 1:
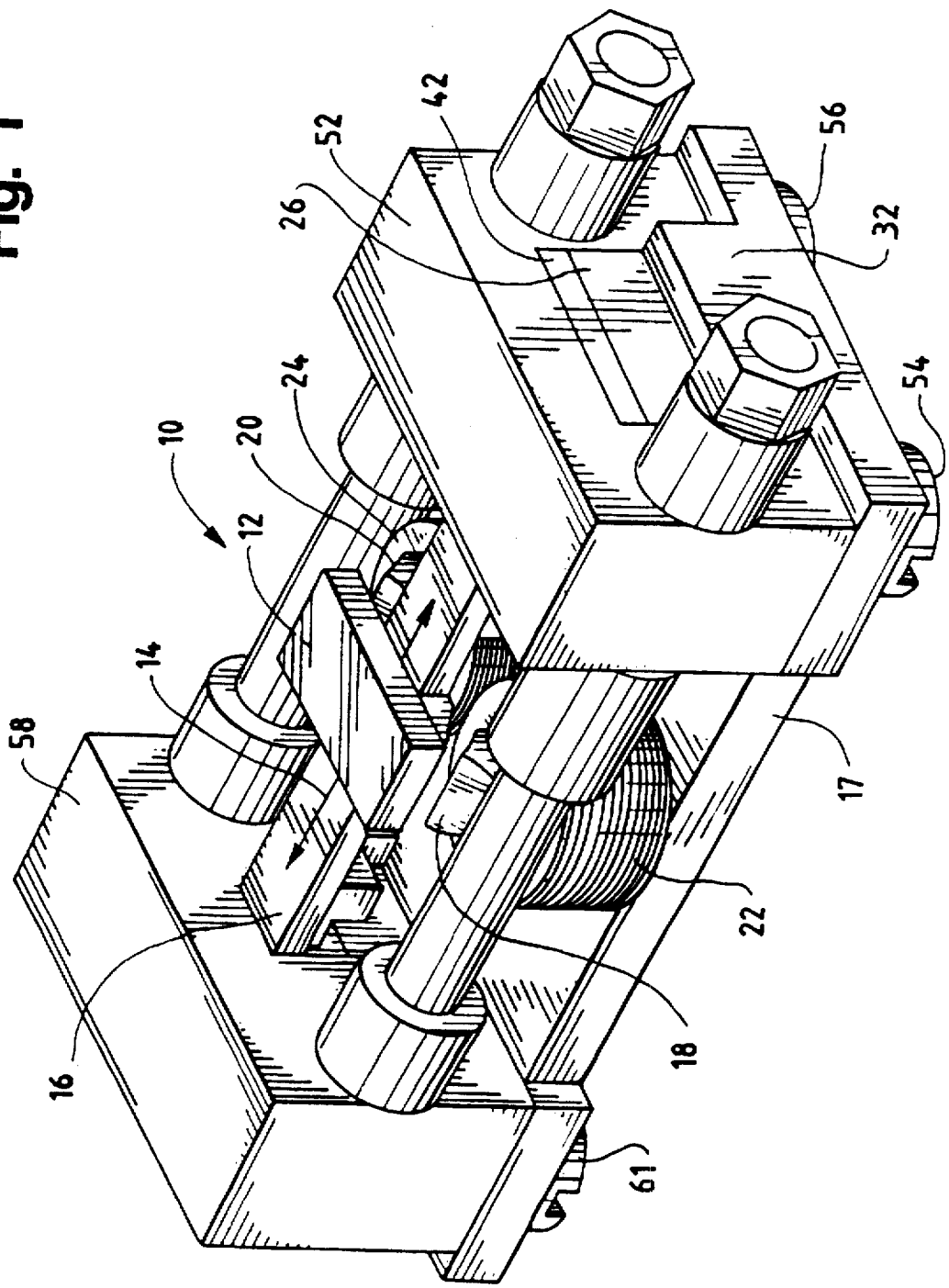
FIG. 1 is a perspective view of a first embodiment of a miniature optical resonant scanner in accordance with the present invention.
Figure 2:
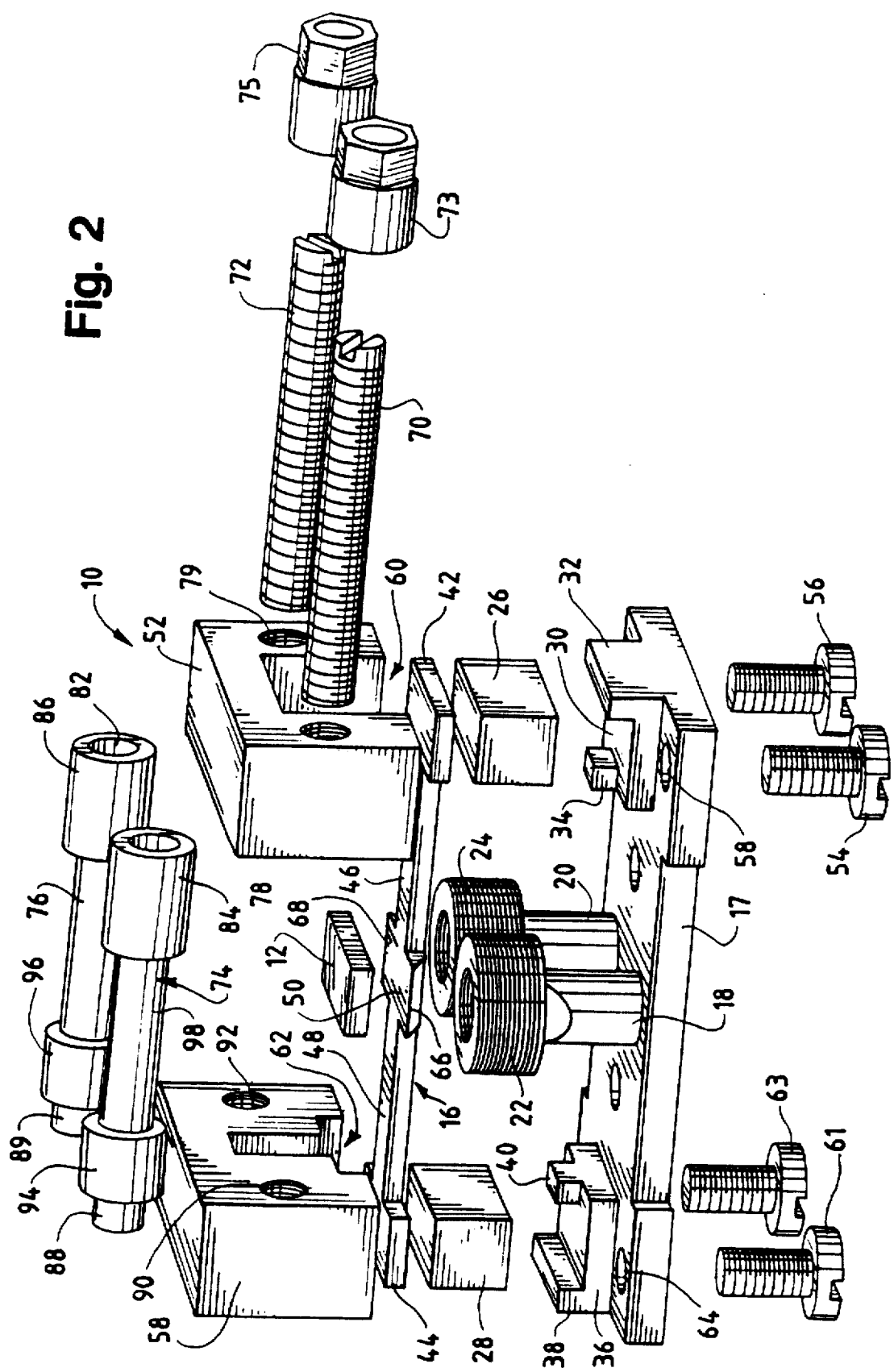
FIG. 2 is an exploded perspective view of the optical scanner of FIG. 1.

The miniature optical resonant scanner 10 of the present invention as shown in FIGS. 1-2 includes a mirror 12. The mirror 12 is driven by a magnetic circuit to oscillate at a high frequency about an axis of rotation 14 where the only moving parts are the mirror 12 and a spring plate 16 which may be integrally formed.

The optical scanner 10 includes a base plate 17 with a pair of stator posts 18, 20 centrally located thereon. The base plate 17 and stator posts 18, 20 are integrally formed in one piece of a soft iron. Stator coils 22 and 24 are wound in opposite directions about the respective stator posts 18 and 20. The electrical coil windings 22 and 24 may be connected in series or in parallel to a drive circuit as discussed below. Mounted on opposite ends of the base plate 17 are first and second magnets 26 and 28, the magnets 26, 28 being equidistant from the stators 18 and 20. In order to locate the magnet 26, the base 17 is formed with a seat 30 having a back stop 32 extending up from one end of the seat 30 and having a front stop 34 extending up from the seat at the opposite end thereof. Similarly, to locate the magnet 28, the base 17 is formed with a seat 36 at the end of the base opposite the seat 30. The seat 36 includes a back stop 38 and a front stop 40 that extend upwardly from the seat 36 at the back and front thereof.

The spring plate 16 is formed of spring steel and is a torsional type of spring having a spring constant determined by its length and width. The spring plate 16 has enlarged opposite ends 42 and 44 that rest directly on a pole of the respective magnets 26 and 28. The magnets 26 and 28 are oriented such that they have like poles adjacent the spring plate. For example, the North poles of the magnet 26 and 28 could be adjacent the spring plate 16 with the South poles of the magnets 26 and 28 adjacent the base 17. Alternatively the South poles of both magnets 26, 28 could be adjacent the spring plate with the North pole of the magnets 26, 28 adjacent the base 17. A narrower arm portion 46, 48 of the spring plate 16 extends from each of the enlarged ends 42, 44 to an enlarged central mirror mounting portion 50 of the spring plate 16. The mirror mounting portion 50 forms the armature of the optical resonant scanner 10 and is mounted directly over the stator posts 18 and 20 such that the axis of rotation 14 of the mirror mounting portion 50 is equidistant from the stator posts 18 and 20. The mirror 12 is mounted on or coated on the mirror mounting portion 50 of the spring plate.

The spring plate 16, magnets 26 and 28 and the base 17 are tightly clamped together by respective spring plate caps 52 and 58. Each cap 52, 58 is formed as a block with openings 60 and 62. The openings 60, 62 are formed so that the caps 52, 58 can accommodate the ends 42, 44 of the spring plate, the magnets 26, 28 and the seats 30, 36 as well as the arms 46 and 48 of the spring plate 16 when the caps 52, 58 are resting on the base 17. The cap 52 is held securely to the base 17 by a pair of screws 54 and 56 so as to clamp the spring plate 16 and magnet 26 to the base. The screws 54 and 56 extend up through apertures 58 in the base 17 on opposite sides of the seat 30 and into threaded apertures formed in the cap 52 on opposite sides of the opening 60. The cap 58 is similarly clamped to the base 17 by respective screws 61 and 63 that extend up through respective apertures 64 formed on opposite sides of the cap opening 62.

Magnetic circuits are formed in the optical scanner 10 so as to oscillate the mirror 12 about the axis of rotation 14 in response to an alternating drive signal. One magnetic circuit extends from the top pole of the magnet 26 to the spring plate end 42, through the arm 46 and mirror mounting portion 50 of the spring plate 16, across a gap to the stator 18 and through the base 17 back to the magnet 26 through its bottom pole. Another magnetic circuit extends from the top pole of the magnet 28 to the spring plate end 44 through the arm 48 and mirror mounting portion 50 of the spring plate 16, across a gap to the stator 18 and through the base 17 back to the magnet 28 through its bottom pole. Similarly, magnet circuits are set up through the stator 20 as follows. One magnetic circuit extends from the top pole of the magnet 26 to the spring plate end 42, through the arm 46 and mirror mounting portion of the spring plate 16, across the gap to the stator 20 and through the base 17 back to the magnet 26 through its bottom pole. Another magnetic circuit extends from the top pole of the magnet 28 to the spring plate end 44, through the arm 48 and mirror mounting portion 50 of the spring plate 16, across the gap to the stator 20 and then through the base 17 back to the magnet 28 through its bottom pole.

When a periodic drive signal such as a square wave is applied to the oppositely wound coils 22 and 24, magnetic fields are created which cause the mirror 12 to oscillate back and forth about the axis of rotation 14. More particularly, when the square wave is high for example, the magnetic field set up by the magnetic circuits through the stator 18 and magnets 26 and 28 cause an end 66 of the mirror mounting portion 50 to be attracted to the stator 18. At the same time, the magnetic field created by the magnetic circuits extending through the stator 20 and the magnets 26 and 28 cause the opposite end 68 of the mirror mounting portion 50 to be repulsed by the stator 20. Thus, the mirror is caused to rotate about the axis of rotation in one direction. When the square wave goes low, the magnetic field created by the stator 18 repulses the end 66 of the spring plate 50 whereas the stator 20 attracts the end 68 of the spring plate portion 50 so as to cause the mirror 12 to rotate about the axis 14 in the opposite direction.

It is noted that for high frequency operations the impedance of each coil 22, 24 must not become so large to effectively decrease the current flow therethrough. Therefore, as the frequency of operation increases the number of turns in each coil 22, 24 should be decreased.

Further, at high frequency operations although losses are not seen in the magnetic circuits through the magnets 26 and 28 described above, eddy current losses do exist in another magnetic circuit of the scanner. More particularly, eddy current losses exist in the magnetic circuit from the stator 18 to the base 17; through the base 17 to the stator 20; from the stator 20 across the gap to the spring plate 16; through the mirror mounting portion 50 of the spring plate 16; and across the gap back to the stator 18 with the magnetic flux induced from the coils also circulating through this circuit in the opposite direction as well.

Figure 11:
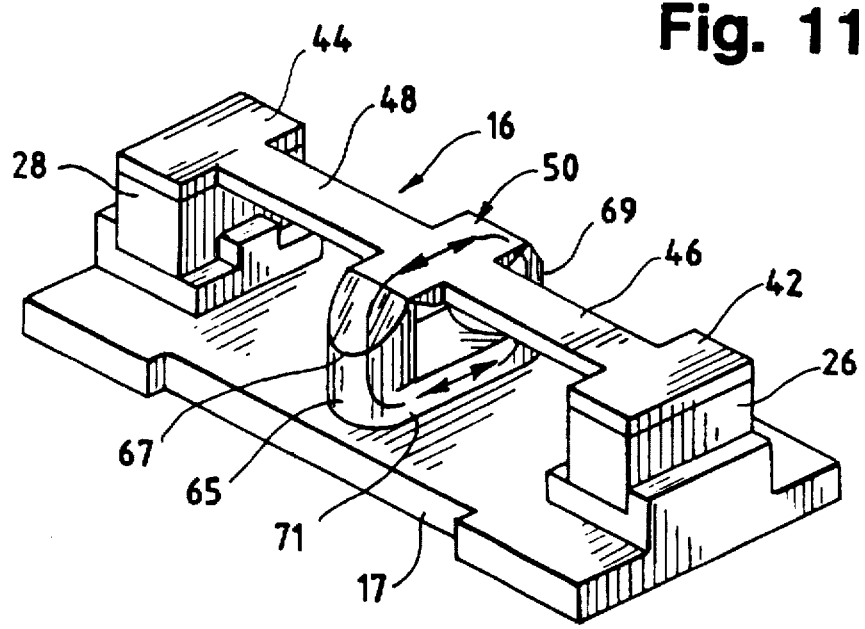
FIG. 11 is a perspective view of a stator-base insert mounted on the base of the optical scanner of FIG. 1.
Figure 12:
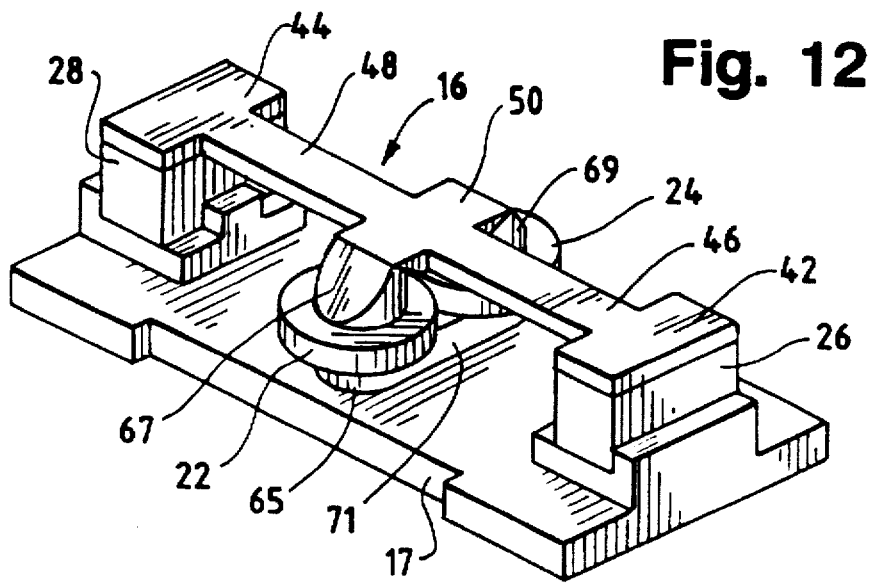
FIG. 12 is a perspective view of the stator-base insert of FIG. 11 with the stator coils mounted thereon.

The eddy current losses affecting this circuit increase with the square of the frequency. However, these losses are inversely proportional to the volume resistivity of the materials used to form the circuit. Therefore, by lowering the volume resistivity of at least the stators and base, the eddy current losses at high frequencies of operation can be reduced. The volume resistivity can be lowered, for example, by utilizing laminations of the material, such as soft iron, forming the base and stators 18, 20; by utilizing powdered iron pressed into the desired shape of the base and stators; or by utilizing ferrite to form the base and stators. These are just a few of the possible methods that can be used to reduce the volume resistivity. The entire base 17 and stators 18 and 20 can be manufactured in accordance with one of these methods. Alternatively, however, only that portion of the base 17 that forms part of the magnetic circuit between the stators as well as the stators themselves could be manufactured in accordance with one of these methods. This latter method can be achieved with a stator-base insert 65 shown in FIGS. 11 and 12. The stator-base insert 65 includes stators 67 and 69 that are integrally formed with a base portion 71 so as to have low volume resistivity. The base 71 of the insert 65 may rest directly on the base 17 of the scanner as shown in FIGS. 11 and 12. Alternatively, the base 17 of the scanner may be formed with an aperture therein to accept the base 71 of the insert 65 so that the base 71 of the insert is mounted flush with the base 17 of the scanner.

Another feature of the optical scanner 10 in accordance with the present invention is that the resonant frequency of the scanner 10 is tuneable after the scanner is manufactured. This is accomplished by a pair of frequency adjustment screws 70 and 72 that cooperate with a pair of rods 74 and 76. The screws 70 and 72 can be adjusted so as to increase the tension in the spring plate 16 thereby increasing the resonant frequency of the optical scanner 10 or to decrease the tension in the spring plate 16 to thereby decrease the resonant frequency of the optical scanner 10.

More particularly, the frequency adjustment screws 70 and 72 are screwed into threaded apertures 78 and 79 that extend through the body of the cap 52 on opposite sides of the opening 60. The screws 70 and 72 also extend into apertures 80 and 82 in respective, enlarged ends 84 and 86 of the temperature compensation rods 74 and 76, discussed in detail below and held in place by locknuts 73 and 75. The opposite ends 88 and 89 of the rods 74 and 76 are inserted into nonthreaded apertures 90 and 92 formed in the body of the cap 58 on opposite sides of the opening 62. Enlarged sections 94 and 96 adjacent to the ends 88 and 89 of the rods 74 and 76 form stops to limit the length of the rods 74, 76 that extend into the apertures 90, 92 of the cap 58. Tension in the spring plate 16 is lowered to decrease the resonant frequency of the optical scanner by unscrewing the frequency adjustment screws 70 and 72 farther out of the apertures 78 and 79. By increasing the amount of the screws 70, 72 that is screwed into the apertures 78 and 79 so that the effective length of the rods between the caps 52 and 58 is increased, the screws and rods can exert a force on the caps 52 and 58 to push the caps 52 and 58 apart from each other. The caps 52 and 58 act on the ends 42 and 44 of the spring plate 16 so as to pull the ends 42 and 44 of the spring plate 16 apart. This force increases the tension in the spring plate to increase the resonant frequency thereof and thus increase the resonant frequency of the optical scanner 10 as a whole.

It is desirable to maintain the resonant frequency of the optical scanner 10 constant over an operating range of temperatures. As the temperature increases, the spring plate 16 expands resulting in an increase in the rotational inertia of the scanner 10. This increase in the rotational inertia causes the resonant frequency of the scanner 10 to decrease. The rods 74 and 76 compensate for increases in temperature and the resulting decrease in the resonant frequency by increasing the tension in the spring plate 16 as the temperature increases. When the tension in the spring plate 16 is increased, the resonant frequency of the spring plate also increases. Thus the rods 74 and 76 compensate for temperature increases by increasing the tension in the spring plate 16 to maintain the resonant frequency of the scanner 10 relatively constant.

More particularly, in one embodiment of the rods 74 and 76, a passive form of temperature compensation is employed. In the passive embodiment, a portion or all of the rods 74 and 76 are made of a material having a greater thermal expansion coefficient than that of the material out of which the spring plate 16 is formed. Thus, as the temperature increases, the rods 74 and 76 expand more than the spring plate 16 expands. The expansion of the rods 74 and 76 causes a force to be applied to the caps 52 and 58 to push the caps 52, 58 apart from each other. As the caps 52 and 58 are pushed apart, the caps act on the ends 42 and 44 of the spring plate 16 causing the ends 42 and 44 to move apart thereby increasing the tension in the arms 46 and 48 of the spring plate. This increase in tension in the spring plate 16 causes the resonant frequency to increase. Thus, as the temperature causes the spring plate to expand, lowering the resonant frequency, the temperature compensation rods 74 and 76 compensate for this decrease in frequency by applying a force to the spring plate 16 via the caps 52 and 58 so as to increase the tension in the spring plate and thus increase the resonant frequency so as to maintain it relatively constant over the operating range of temperatures of the optical scanner 10. It is noted that the rods 74 and 76 may be made of one material or of a combination of a number of materials having different thermal expansion coefficients arranged in a series along the length of the rods 74 and 76 so as to obtain the desired expansion characteristics.

In another embodiment of the rods 74 and 76, active temperature compensation is employed. For active temperature compensation, a piezoelectric material is utilized that is responsive to an electrical signal so as to vary its length. For example, each of the temperature compensation rods 74, 76 may be formed in two separate sections as opposed to being integrally formed as described above. In such an embodiment, the rod 74, for example, may be split into two distinct parts so that the end 88 and enlarged portion 94 form one section and the mid-portion of the rod 98 and the enlarged end 84 form a second section of the rod. In this embodiment, the enlarged section 94 would be formed with an aperture therein to allow the end of the mid-section 98 to be inserted therein. Prior to insertion of the end of the mid-section 98 into the aperture of the enlarged section 94, a piezoelectric element may be positioned in the aperture of the enlarged section 94. A temperature sensor, not shown, may be used to sense the temperature of the scanner 10 and in particular the spring plate 16 so as to provide an electrical signal representative thereof. The piezoelectric element in the rod 74 would be responsive to an electrical signal indicating an increase in temperature to expand causing the mid-portion 98 of the rod to be pushed out so as to increase the effective length of the rod 74. Thus, as the temperature is increased, the piezoelectric element causes the rod to increase in length to push apart caps 52 and 58, increasing the tension in the spring plate as well as the resonant frequency to compensate for the temperature change. The above is just one example of an active temperature compensation rod. Many modifications can be made to the active compensation rod embodiment of the present invention. For example, a portion of the rod 74, 76 may be made of a piezoelectric material, obviating the need for a separate piezoelectric element. Non-electrical expansion elements may also be utilized. For example, mechanical means including a lead screw and motor may be used to adjust the frequency adjustment screws 70 and 72 to change the tension in the spring plate as discussed above wherein a controller that is responsive to increases in temperature would be employed to control the motor and the positioning of the frequency adjustment screws 70 and 72. These are just a few examples of active and passive temperature compensation techniques for the optical scanner 10 in accordance with the present invention.

A second embodiment of 10' the optical resonant scanner in accordance with the present invention is shown in FIGS. 3-6. The optical scanner 10' includes a base 17' that supports a pairs of stators 18' and 20' having coils 22' and 24' respectively wound thereabout. The base 17' also supports a pair of magnets 26' and 28' positioned on opposite sides of the base and equidistant from stator posts 18' and 20'. A spring plate 100 rests on the magnets 26' and 28'. Four screws, only two of which 102 and 104 being shown, extend through apertures in respective clamp plates 101 and 103 and through respective apertures 106-109 in the spring plate 100 to screw into threaded apertures 110-113 formed in the base 17'. These screws clamp the spring plate 100 and magnets 26' and 28' to the base 17' of the scanner 10'.

Figure 6:
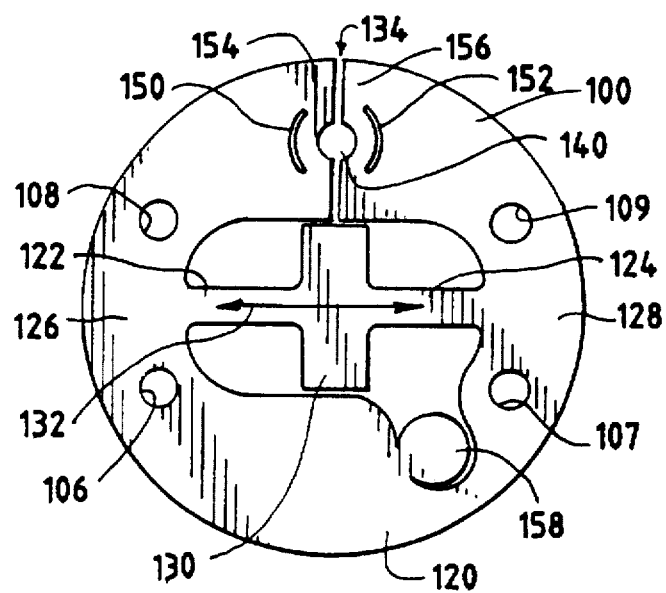
FIG. 6 is a top view of the spring plate of the scanner of FIG. 3.

As shown in FIG. 6, the spring plate 100 has a generally circular outer periphery 120. A pair of arms 122 and 124 extend between the spring plate supporting portions 126 and 128 of the outer periphery 120 and a mirror mounting portion 130. As discussed above, the mirror 12' may be coated onto the mirror mounting portion 130 of the spring plate 100 or a separately formed mirror may be bonded onto the mirror mounting portion 130. The magnetic circuits set up in the optical scanner 10' are essentially the same as described above for the optical scanner 10 such that the mirror 12' is caused to oscillate about an axis of rotation 132 that extends through the arms 122 and 124 of the spring plate 100.

Figure 6A:
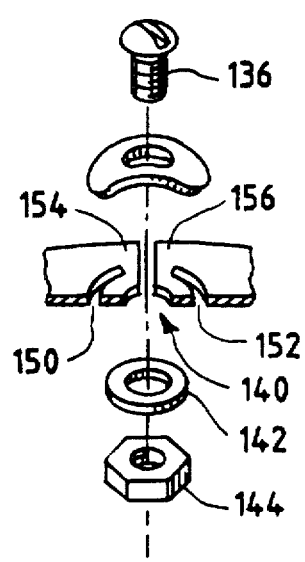
FIG. 6A is a perspective view of the tuning mechanism for the spring plate of FIG. 6.

In order to tune the optical scanner 10', a gap 134 is formed in the outer periphery 120 of the spring plate 100. As shown in FIG. 6A, a tuning screw 136 extends through the aperture of a bent washer 138 and through an enlarged aperture 140 of the spring plate 100. The screw 136 also extends through a flat washer 142 and is held in place by a nut 144. Opposite ends 146 and 148 of the bent washer extend into arcuate slots 152 formed in the outer periphery 120 of the spring plate 100 adjacent to opposite sides of the aperture 140. As the screw 136 is screwed farther and farther into the nut 140, the screw 136 exerts a force on the bent washer 138 tending to flatten it out. This causes the ends 146 and 148 of the washer to exert a force on the ends 154 and 156 of the spring plate 100 adjacent the gap 134, pushing the ends 154 and 156 apart. As the ends 154 and 156 are pushed apart, the tension in the spring plate arms 122 and 124 increases so as to increase the resonant frequency of the spring plate 100 and thus the scanner 10'. Thus, the spring plate 100 has a resonant frequency that is tunable by adjusting the frequency adjustment screw 136 to increase or decrease the flatness of the bent washer 138. It is noted that the spring plate 100 may also include an identification tag area 158 if desired.

Figure 3:
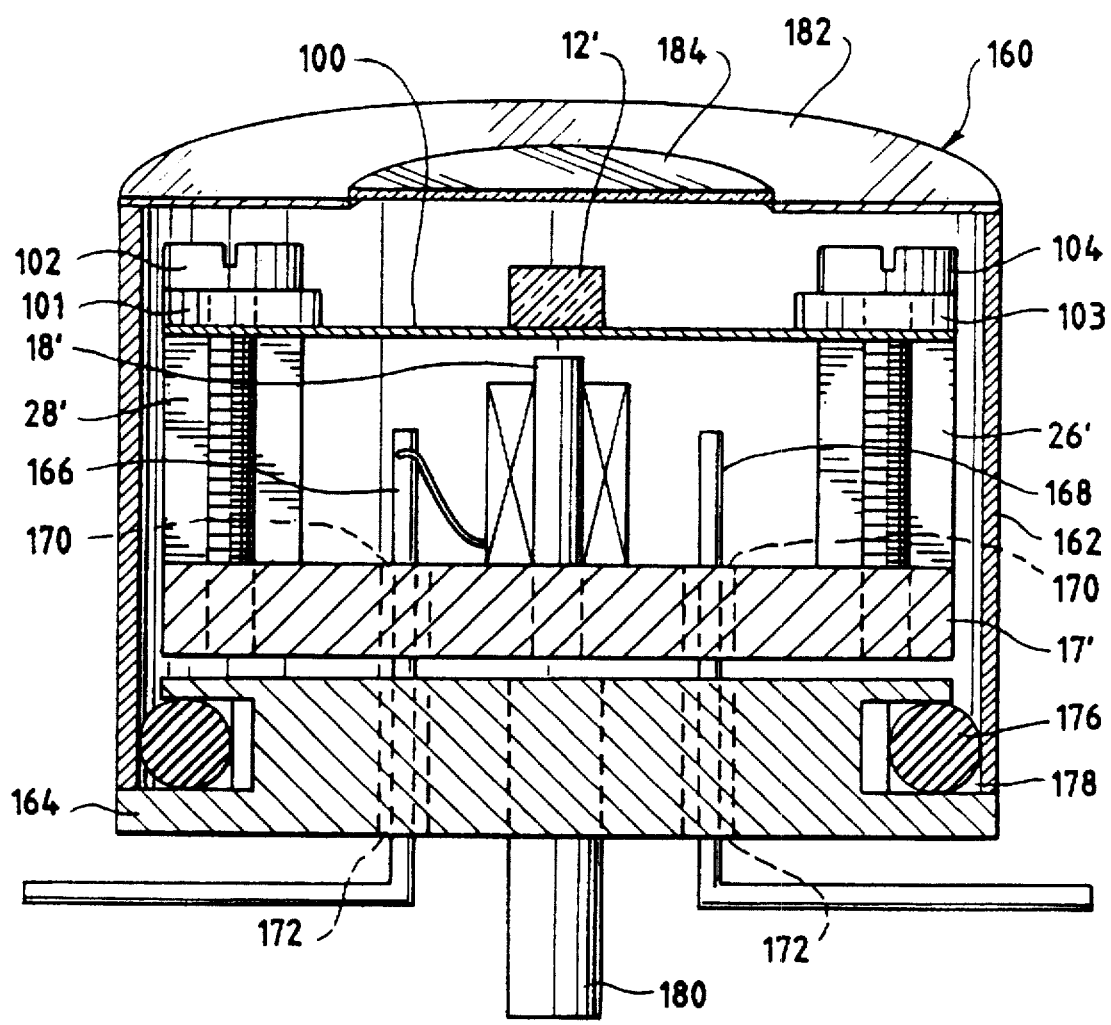
FIG. 3 is a crosssectional view of a miniature optical resonant scanner of a second embodiment of the present invention.
Figure 4:
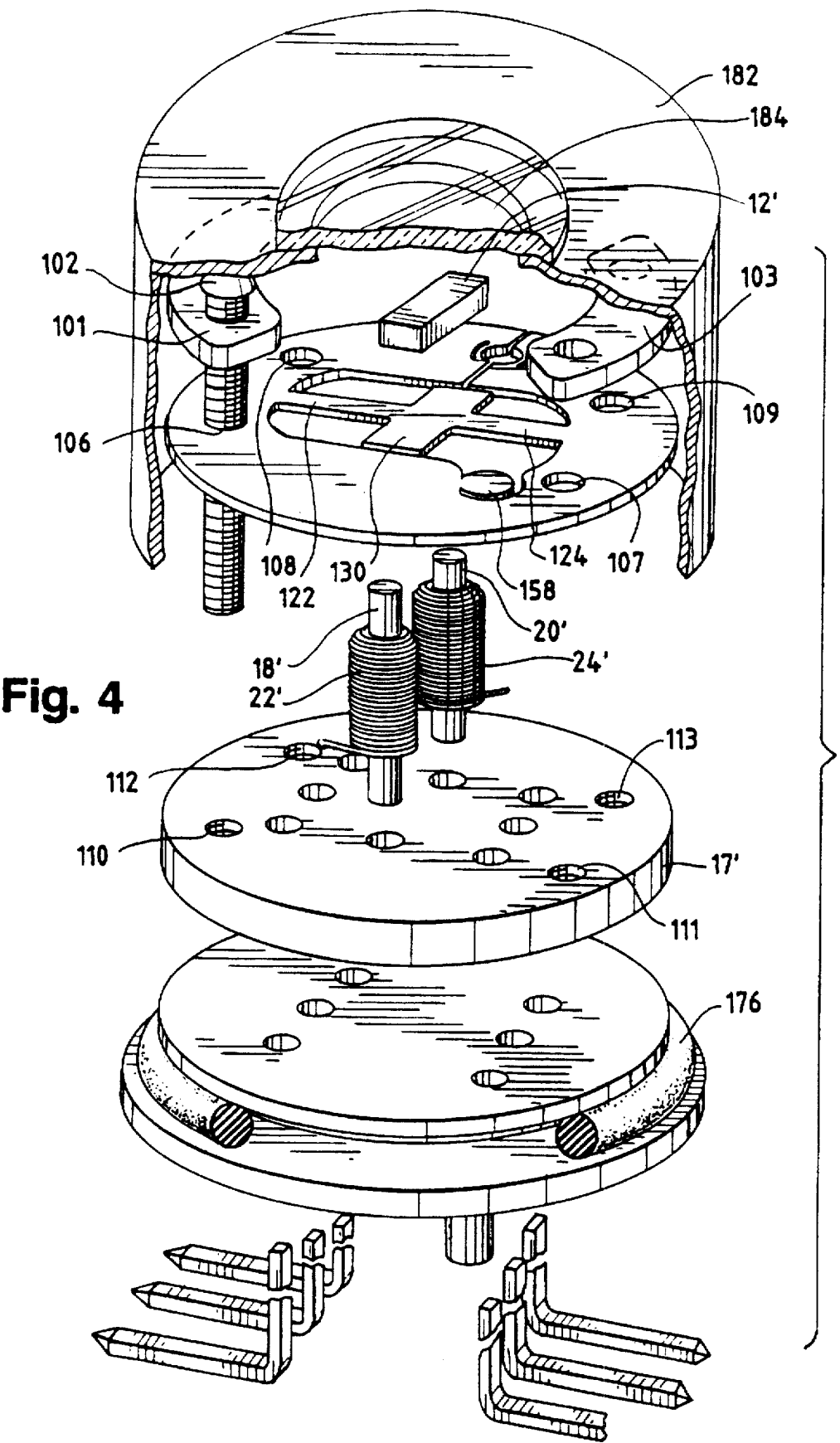
FIG. 4 is a partial exploded perspective view of the optical scanner of FIG. 3.
Figure 5:
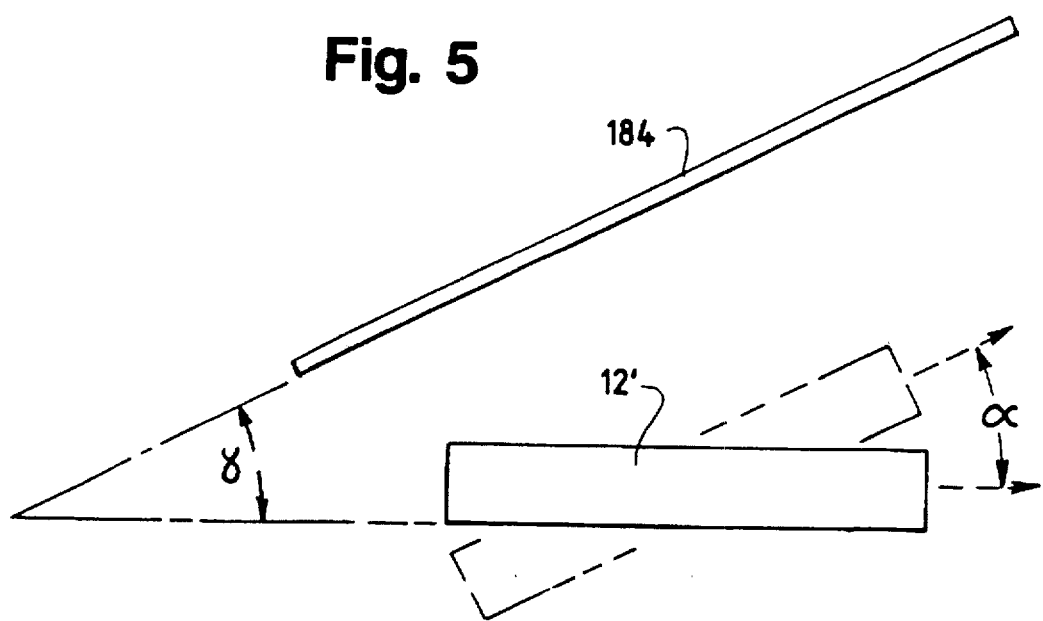
FIG. 5 is a diagrammatic illustration of the angular relation between the scanning mirror and housing window of the scanner of FIG. 3.

The optical scanner of the present invention may be disposed in a housing that forms a vacuum chamber such as the housing 160 for the scanner 10' shown in FIGS. 3 and 4. The use of a vacuum chamber housing minimizes the problems due to loss of energy, air turbulence and noise when operating at high frequencies. The housing 160 is generally cylindrical in shape having a sidewall 162 extending generally perpendicular to a housing base 164 which in turn is generally parallel to the base 17' of the scanner 10'. The base 17' of the optical scanner 10' is supported on the housing base 164 by posts, two electrical posts 166 and 168 being shown, that extend through apertures 170 formed in the base 17'. The posts 166 and 168 extend through apertures 172 in the housing base 164 wherein an epoxy is filled into the apertures 172. Silicone rubber is filled into the apertures 170 of the scanner base 17' to secure the posts 166, 168 therein but to accommodate shearing forces which may be exerted thereon. An O-ring 176 is disposed in a channel 178 extending about the upper periphery of the housing base 164 wherein the O-ring seals the housing sidewall 162 to the base 164. Further a vacuum port 180 is formed in the base 164 of the housing 160.

The top wall 182 of the housing 160 is not parallel to the housing base 164 or to the scanner base 17' but is disposed at an angle thereto. The top wall 182 is angled to support a window 184 formed therein at an angle with respect to the mirror 12' when the mirror is in its rest or stationary position such that the mirror 12' is parallel for example to the base 17' as shown in FIG. 3. The window 184 allows light to enter the housing 160 so that it can be reflected out of the housing 160 and scanned by the mirror 12'. By angling the window 184 with respect to the scanning mirror 12' in its rest position, multiple reflections caused by the window 184 may be minimized. Preferably, the angle formed between the window 184 and the mirror 12' in its rest position is greater than the optical scan angle of the mirror 12', where the optical scan angle is twice the mechanical scan angle through which the mirror 12' is rotated by the magnetic circuits described above.

The optical resonant scanners 10 and 10' as described above can be made extremely small for those applications in which it is desirable to minimize the size of the scanner. For example, the housing 160 may have a diameter that is less than two centimeters and a height that is less than one centimeter. Further, because only the mirror and a portion of the spring plate move, the mass of the moving parts in the optical scanner 10, 10' is minimized. Because the mass of the moving parts in the scanner is minimized and is as close to the axis of rotation as possible, the rotational inertia of the scanner is minimized. Thus the optical scanner of the present invention may be made with a high resonant frequency such as on the order of 24 khz or higher.

Figure 7:
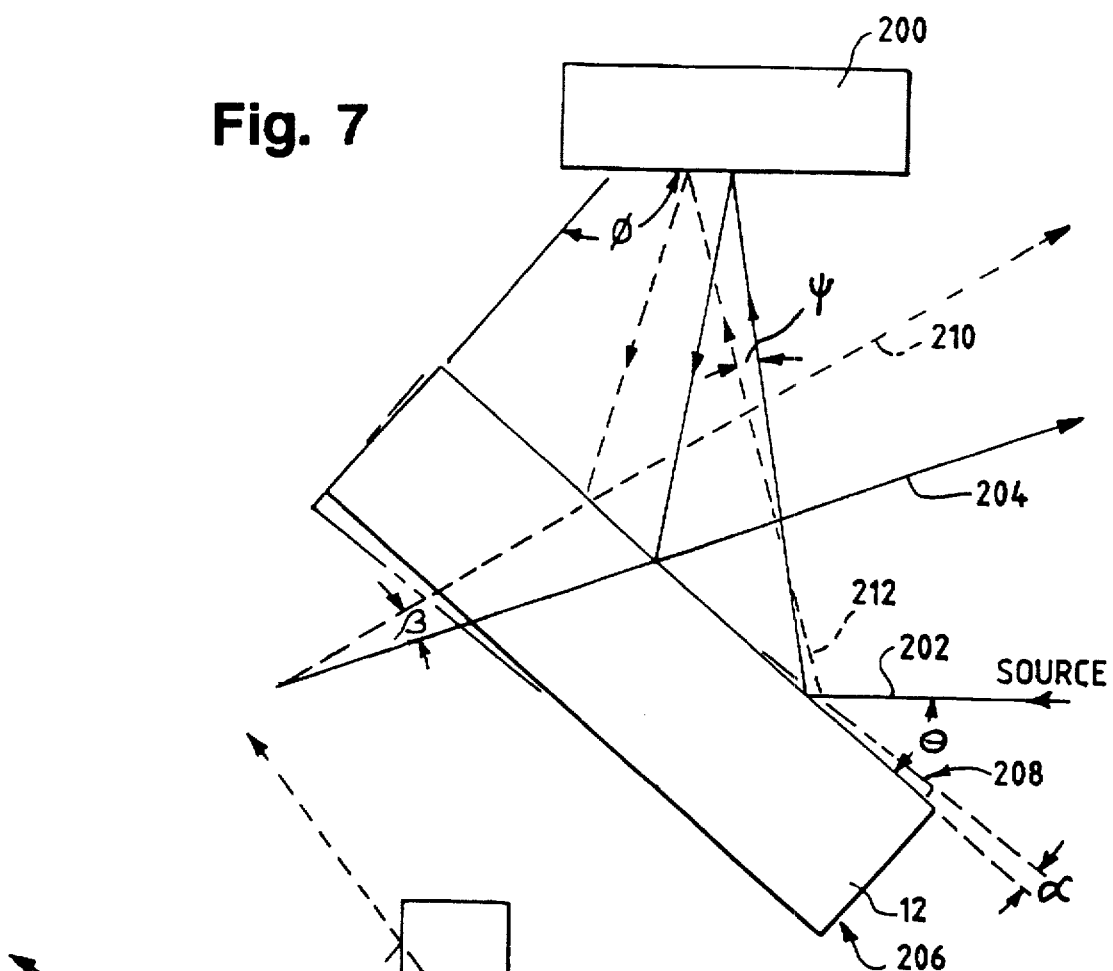
FIG. 7 is a diagram illustrating a single axis scanning system with a multiplying mirror.

In accordance with another feature of the present invention, the optical scanner 10, 10' may be used with a multiplying mirror so as to substantially increase the optical scan angle of the optical scanner. For example, as shown for the mirror 12 of the scanner 10 in FIG. 7, by employing a multiplying mirror 200 placed at a location with respect to the scanning mirror 12 such that incoming light 202 from a source first reflects off of the scanning mirror 12 onto the multiplying mirror 200 from which the light is reflected back onto the scanning mirror 12, a doubling of the optical scan angle ψ off of the scanning mirror 12 is achieved. The positioning of the scanning mirror 12 and the multiplying mirror 200 as shown in FIG. 7 forms a retro-reflective scanning system such that the exit light beam 204 is reflected almost 360° back towards the source beam. In FIG. 7, a mechanical scan angle α is shown between the mirror 12 in a first position 206 shown by the solid line and the mirror 12 after it has been rotated to a second position 208 shown by the dotted line. By simple geometry it can be shown that the optical scan angle ψ is equal to twice the mechanical scan angle α and that the optical scan angle ψ is doubled by the retro-reflective scanning system of FIG. 7. More particularly, the output optical scan angle β is equal to 2ψ, where β is the angle between the exit beam 204 which is the input beam 202 after it has been reflected twice off of the scanning mirror 12 in the first position 206 and a beam 210 which is the input beam 212, from the same source as the input beam 202, after the beam 212 has been reflected twice off of the scanning mirror 12 in the second position 208. If the angles θ and φ between the mirrors 12 and 200 and the source beams 202 and 212 are changed such that the light beams reflect off of the scanning mirror 12 multiple times n, the optical scan angle is multiplied by the number of times n that the beam reflects off of the scanning mirror 12. For example, if the position of the mirrors 200 and 12 and the angles θ and φ are such that the source beam is reflected off of the scanning mirror 12 four times, then the output optical scanning angle β will be four times the optical scan angle ψ.

Figure 8:
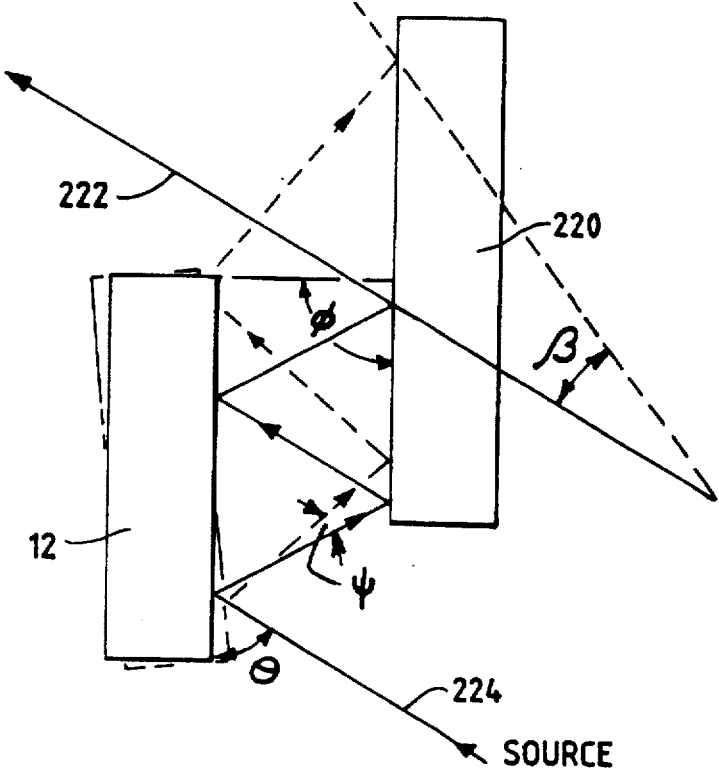
FIG. 8 is a second embodiment of the scanning system in accordance with the present invention for a single axis.

FIG. 8 illustrates the positioning of the scanning mirror 12 and a multiplying mirror 220 so as to form a trans-reflective scanning system such that the exit beam is almost parallel and travels in generally the same direction as the incoming source beam 224 as the beam 224 first hits the scanning mirror 12. Again in this embodiment, it can be seen that the output optical scan angle β in FIG. 8 is two times the optical scan angle ψ. Again by altering the angles θ and φ between the mirrors 12, 220 and the source beam 224 to increase the number of times that the source beam reflects off of the scanning mirror 12, the output optical scan angle can be further increased over the optical scan angle ψ.

Figure 9:
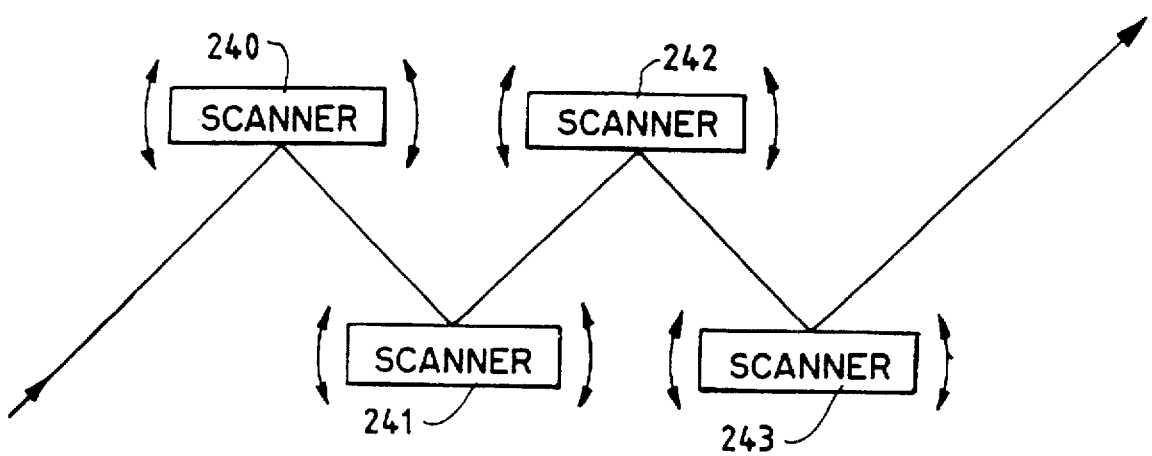
FIG. 9 is a diagram illustrating series scanners.

The use of a multiplying mirror 200, 222 that is positioned relative to a scanning mirror 12 such that a source beam reflects off of the same scanning mirror 12 a number of times has several advantages over using two scanners in series in order to increase the optical scan angle, this later method being depicted for the scanners 240–243 in FIG. 9 wherein the source beam is reflected off of each of the scanners only once. In particular, the embodiment of the present invention depicted in FIGS. 7 and 8 does not have problems caused by phase differences between the series scanning mirrors of the configuration depicted in FIG. 9. Further, the embodiments of the invention depicted in FIGS. 7 and 8 require less power than the embodiment shown in FIG. 9 since only one of the mirrors is scanned. In addition, the size and weight of each of the scanning systems shown in FIGS. 7 and 8 is less than that of the series scanning system shown in FIG. 9.

Figure 10:
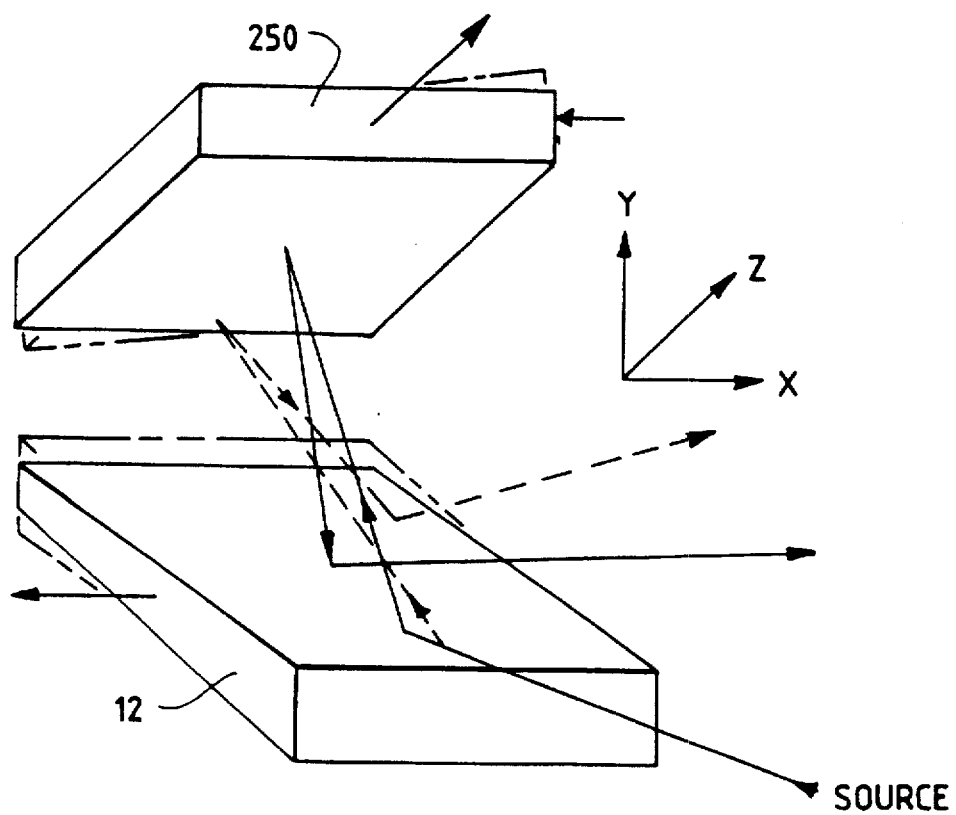
FIG. 10 is a diagram illustrating a second optical scanner used as the multiplying mirror to provide a two axis scanning system.

FIG. 10 illustrates another embodiment of a multiplying mirror scanning system for applications requiring the light beam to be scanned in two orthogonal directions. In this embodiment the multiplying mirror 250 is an optical scanner that scans the light in a direction orthogonal to the direction that the first scanning mirror 12 scans the light. For example, as shown in FIG. 10, the scanning mirror 12 oscillates about the x axis; whereas the multiplying scanning mirror 250 oscillates about the z axis. The output optical scan angle of the mirror 12 is doubled because the light beam reflects off the scanning mirror 12 twice using the multiplying scanning mirror 250 as discussed above for the retro-reflective type of system. However, the output optical scan angle of the multiplying scanning mirror 250 is not doubled since the light reflects only once off of the multiplying scanning mirror 250. If the multiplying scanning mirror 250 and first scanning mirror 12 are set up as discussed above for optical scan angle multiplying that is greater than two times in a retro-reflective type system as depicted in FIG. 10 then the optical scan angle of the multiplying scanning mirror 250 can also be increased. For example, if the system is set up so that the light beam reflects off of the scanning mirror 12 four times and reflects off of the multiplying scanning mirror 250 three times in a retro-reflective type system, the output optical scan angle for the scanning mirror 12 will be four times the optical scan angle ψ and the output optical scan angle of the multiplying scanning mirror 250 will be three times the optical scan angle ψ′ where the ψ′ is equal to twice the mechanical scan angle through which the mirror 250 rotates. It is noted that a multiplying scanning mirror may also be utilized instead of the stationery mirror 220 in the trans-reflective type of system. In this embodiment the optical scan angle multiplier is the same as the number of reflections for both of the scanning mirrors.

Positioning a second axis optical scanner to form a multiplying mirror has several advantages. In particular, fewer mirrors are required to increase the optical scan angle for the multiplying scanning mirror for a second axis scan than in prior systems. Further, the overall size and weight of this two axis scanning system is minimized while providing large scan angles.

Many modifications and variations of the present invention are possible in light of the above teachings. Thus, it is to be understood that, within the scope of the appended claims, the invention may be practiced otherwise than as described hereinabove.

What is claimed and desired to be secured by letters patent is:

1. An optical scanning system for scanning a light beam from a source of light comprising:

a multiplying mirror for reflecting a light beam;

a first optical scanning mirror for reflecting a light beam from said source, said first optical scanning mirror oscillating about an axis of rotation through a mechanical first scan angle to provide a first optical scan angle and said multiplying mirror being positioned relative to said first optical scanning mirror to reflect the reflected light beam from said first optical scanning mirror back onto said first optical scanning mirror such that the light beam is reflected by said first optical scanning mirror a multiple number of times before being output from the scanning system to cause said first optical scanning mirror to scan said light beam through an output scan angle that is greater than said first optical scan angle by a factor that is equal to said multiple number of times.

2. An optical scanning system as recited in claim 1 wherein said first optical scanning mirror and multiplying mirror are positioned relative to each other to form a retro-reflective scanning system.

3. An optical scanning system as recited in claim 1 wherein said first optical scanning mirror and multiplying mirror are positioned relative to each other to form a trans-reflective scanning system.

4. An optical scanning system as recited in claim 1 wherein said multiplying mirror is stationary.

5. An optical scanning system as recited in claim 1 wherein said multiplying mirror is a scanning mirror.

6. An optical scanning system as recited in claim 1 wherein said first optical scanning mirror scans light relative to a first axis and said multiplying mirror is a scanning mirror that scans said light relative to a second axis that is orthogonal to said first axis.

7. An optical scanning system as recited in claim 1 wherein said light beam is reflected off of said first optical scanning mirror a multiple number of times that is greater than two.

* * * * *